H. A. NELON.
MEASURING FAUCET.
APPLICATION FILED AUG. 5, 1909.
955,983.
Patented Apr. 26, 1910.
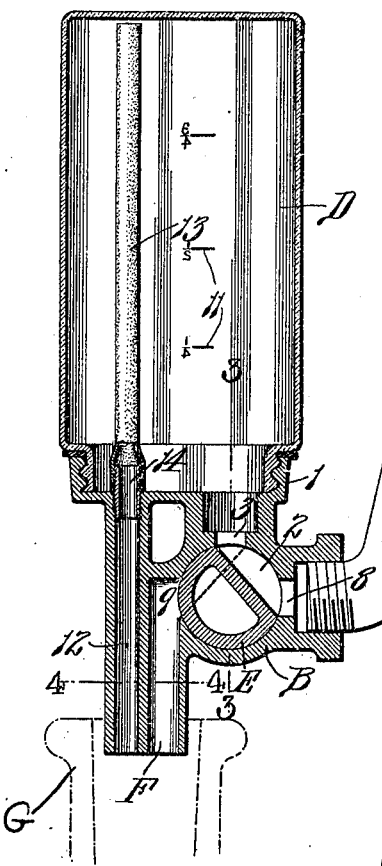
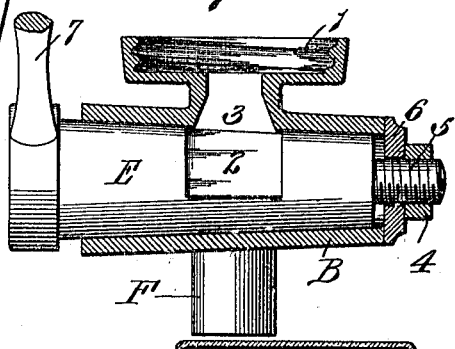
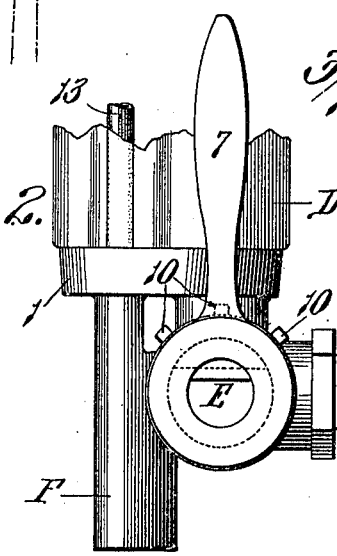
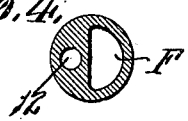
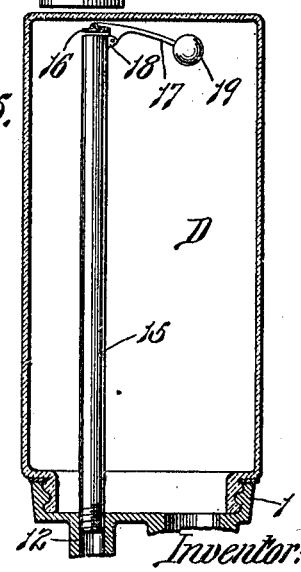
Witnesses:
George Ladson
Wells L. Church
Inventor:
Harry A. Nelon.
By Paul Bakewell
Atty.

UNITED STATES PATENT OFFICE.

HARRY A. NELON, OF ST. LOUIS, MISSOURI.

MEASURING-FAUCET.

955,983.  Specification of Letters Patent.  Patented Apr. 26, 1910.

Application filed August 5, 1909. Serial No. 511,363.

*To all whom it may concern:*

Be it known that I, HARRY A. NELON, a citizen of the United States, residing at St. Louis, Missouri, have invented a certain new and useful Improvement in Measuring-Faucets, of which the following is a full, clear, and exact description, such as will enable others skilled in the art to which it appertains to make and use the same.

This invention relates to measuring faucets.

One object of my invention is to provide a measuring faucet which is so designed that the flow of liquid from the spout of the faucet will be cut off automatically when the liquid in the receptacle being filled reaches a certain level and thus overcome the possibility of the liquid overflowing from said receptacle in case the operator fails to turn the spigot of the faucet when the receptacle is filled.

Another object of my invention is to provide a measuring faucet which is so designed that the liquid will not drip from the spout after the spigot has been turned to cut off the flow of the liquid.

Another object is to provide a measuring faucet having a spout which is so designed that the air can escape from the receptacle being filled and pass into the measuring vessel above the level of the liquid therein, thereby permitting a closed receptacle to be used as the measuring vessel and also overcoming the necessity of using a funnel in the operation of filling a small portable receptacle.

Another object of my invention is to provide a measuring faucet which is so designed that an ordinary glass fruit jar can be used as the measuring vessel. And still another object of my invention is to provide a measuring faucet of simple construction that can be manufactured at a low cost and which is so designed that the spigot or valve can be tightened in case it becomes worn.

Other objects and desirable features of my invention will be hereinafter pointed out.

Figure 1 of the drawings is a vertical sectional view of a measuring faucet constructed in accordance with my invention; Fig. 2 is a side elevational view of said faucet; Fig. 3 is a vertical sectional view taken on approximately the line 3—3 of Fig. 1; Fig. 4 is a horizontal sectional view taken on approximately the line 4—4 of Fig. 1; and Fig. 5 is a vertical sectional view illustrating a slightly modified form of my invention.

Referring to Fig. 1 of the drawings which illustrates the preferred form of my invention, A designates a container, such, for example, as a barrel or keg, that holds a large quantity of liquid, and B designates the body portion of my improved measuring faucet. The faucet herein shown is provided with a pipe C that is screwed into the receptacle A so that the faucet and the measuring vessel thereon will be arranged in a lower horizontal plane than the bottom of the container A, and thus permit the entire contents of said container to drain out of same. It will, of course, be understood, however, that the faucet could be arranged in a higher horizontal plane and that any other suitable connection between the body portion of the faucet and the container A could be used without departing from the spirit of my invention.

The body portion B of the faucet is provided on its upper side with a flange 1 having internal screw-threads, and the measuring vessel of the faucet preferably consists of an ordinary glass fruit jar D arranged in an inverted position and screwed into the flange 1, as shown in Fig. 1 of the drawings. The spigot or valve E is arranged horizontally in the body portion B of the faucet, and said valve is provided with a single duct 2 that permits the liquid in the container A to flow into the measuring vessel D when the valve is in one position, and which permits the liquid in the vessel D to flow out of same through the spout F of the faucet when said valve is in a different position, the body portion B being provided with a port 3 that registers with the duct in said valve when it is arranged in its two different positions.

The valve E is preferably tapered slightly, as shown in Fig. 3, and a nut 4 is mounted on a screw-threaded extension 5 on one end of said valve so as to tighten same or draw it more snugly into the seat provided for same in the body portion B, a washer 6 being interposed between the nut 4 and the adjacent end of the body portion of the faucet. A handle 7 is secured to the opposite end of the valve or spigot E so as to enable it to be turned or oscillated to bring the duct therein into alinement with the port 8 that establishes communication with the container A or the port 9 that establishes communication with the spout F, and, if desired, the body portion of the valve can be provided with lugs 10 or other suitable devices that coöperate with the handle 7 so as to show just how far the spigot has to be turned to establish communication between the measuring vessel and the liquid container or between the measuring vessel and the spout of the faucet.

The duct 2 preferably consists of a notch or recess that is formed in the exterior of the valve E, and when said duct is in the position shown in full lines in Fig. 1, the liquid will flow from the container A into the measuring vessel D and thus fill same or a portion thereof, the vessel being preferably provided with a scale or graduations 11 so as to permit different quantities to be measured. After the desired quantity of liquid has passed into the vessel D the operator turns the spigot E so as to bring the duct 2 therein into register with the port 8 and the port 9, as indicated by dotted lines in Fig. 1, thereby permitting the liquid to flow from the measuring vessel D into a small portable receptacle such, for example, as a jug G that is held under the spout of the faucet. The valve E is so designed that no liquid can escape from the measuring vessel D during the time the liquid is flowing into said vessel, and when said valve is adjusted into position to permit the liquid to flow out of said measuring vessel the port 8 will be closed. By turning the valve into an intermediate position both of the ports 8 and 9 will be closed so that it will be impossible for the liquid to escape from the container into the measuring vessel or into the spout F, or the liquid in the measuring vessel to escape into the spout F or back into the supply pipe C. This is a very desirable feature of my invention for it enables me to fill the vessel D and then permit the liquid to stand therein until it is desired to fill another receptacle G or measure out another quantity of liquid. Furthermore, a valve or spigot of this construction prevents the liquid from dripping from the spout F for when the valve is turned to cut off the flow of liquid from the vessel D the delivery passageway is positively closed at its upper end which overcomes any tendency of the liquid that remains in said passageway to drip from the lower end of the spout.

One objectionable feature of the measuring faucets heretofore in use was that the receptacle being filled would overflow unless the operator turned the spigot before the level of the liquid reached the mouth of said receptacle. One of the objects of my invention is to provide a measuring faucet which is so constructed that the liquid cannot overflow from the receptacle being filled in case the operator fails to turn the spigot to cut off the flow of the liquid, and to accomplish this I have provided means for causing the flow of liquid to be cut off automatically when the liquid in the receptacle being filled reaches a certain level. The faucet can be designed in various ways to accomplish this result but I prefer to provide the spout F with an air duct or passageway 12 that communicates with a vertically disposed pipe 13 arranged inside of the measuring vessel D and terminating adjacent the upper end of said vessel, as shown in Fig. 1.

This air pipe 13 can either consist of a piece of flexible tubing, as shown in Fig. 1, which is slipped over a collar 14 that surrounds the upper end of the air duct 12 in the spout, or said air pipe can consist of a metal tube 15 whose lower end is screwed into the upper end of the air passageway 12, as shown in Fig. 5. The air that is forced out of the portable receptacle G by the liquid flowing into same, passes upwardly through air passageway 12 and air pipe 13 into the measuring vessel D and thus permits the liquid to flow freely from said vessel. When the level of the liquid in the portable receptacle G reaches the lower end of the spigot F, however, said liquid will seal the air passageway 12 and also the delivery passageway and thus cut off communication between the measuring vessel D and the atmosphere. This, of course, causes the liquid to cease flowing from the spout F for liquid will not flow from said spout unless air is being supplied to the upper portion of the vessel D. Owing to the fact that the spout of the faucet is so designed that air can escape from the receptacle being filled, said spout can be made small enough to project into the mouth of an ordinary sized jug or bottle so that it is not necessary to use a funnel with a faucet of this type.

In Fig. 5 I have shown a faucet of substantially the same construction as that illustrated in Fig. 1 except that a valve 16 is provided for closing the air pipe 15 when the liquid in the measuring vessel D approaches the upper end of said pipe. The valve 16 is secured to a lever 17 which is pivotally connected to a lug 18 on the air pipe 15, and a float 19 is secured to one end of said lever so as to cause the valve 16 to move into its closed position before the liquid in the measuring vessel rises high enough to flow into the upper end of said air pipe.

The body portion of the faucet and also the pipe C and the spigot E are preferably formed of cast metal, and as there is very little machine work on said parts the faucet can be manufactured at a low cost, the spigot being extremely simple and inexpensive to make owing to the fact that it is provided with a single duct which is formed in the exterior thereof. When the valve becomes worn it is a very simple matter to tighten same by turning the nut 4, and if the measuring vessel breaks it is not necessary for the owner to send to the manufacturer for a new one because any ordinary glass fruit jar of the "Mason" type can be connected to the flange 1 on the body portion of the valve.

While I prefer to uses a glass fruit jar to form the measuring vessel or chamber of the faucet I do not wish it to be understood that my broad idea is limited to this exact construction. Nor do I wish it to be understood that my broad idea is limited to a faucet that is adapted to be used on barrels and similar containers for measuring the liquid that is drawn from said containers because this feature of automatically cutting off the flow of liquid from the faucet could be embodied in various other devices or apparatuses without departing from my invention.

One desirable feature of a spout of the construction herein described is that it can be used for filling a receptacle or container having a mouth which is just large enough to receive the spout. Consequently, such a spout can be used advantageously whenever it is desired to introduce liquid from one vessel or receptacle into another vessel without coming in contact with the atmosphere. When used for such a purpose the spout is inserted tightly in the mouth or receiving opening of the receptacle which is to be filled so that the air will escape from said receptacle through the air passageway in the spout.

From the foregoing it will be seen that my faucet has a number of features that make it a decided improvement on the measuring faucets which have heretofore been in use. It is compact and presents a neat and ornamental appearance, and as it comprises only a few cast metal parts it can be manufactured at a very low cost. Another very desirable feature is that dust, flies, and other foreign matter cannot enter the measuring vessel for said vessel is closed.

Having thus described my invention, what I claim as new and desire to secure by Letters Patent is:

1. In an apparatus of the character described, a faucet that is adapted to be connected to a liquid container, a circular flange on said faucet that is provided with internal screw-threads, an inverted glass jar provided with a screw-threaded portion that projects into the flange on said faucet, and an air pipe arranged inside of said jar and communicating with an air duct which is formed in the spout of said faucet.

2. In an apparatus of the character described, a liquid container, a pipe tapped into said container and projecting downwardly below the bottom thereof, a faucet connected to the lower end of said pipe, a screw-threaded flange on said faucet, an inverted glass jar provided at its lower end with a screw-threaded portion that projects into said flange, an air conduit arranged inside of said jar and having its lower end terminating adjacent the spout of said faucet, and a valve for controlling the flow of the liquid into and out of said jar.

In testimony whereof I hereunto affix my signature in the presence of two witnesses, this thirty first day of July 1909.

HARRY A. NELON.

Witnesses:
WELLS L. CHURCH,
GEORGE BAKEWELL.